No. 722,376. PATENTED MAR. 10, 1903.
J. G. MOOMY.
PNEUMATIC TIRE.
APPLICATION FILED JUNE 30, 1902.
NO MODEL.

Witnesses
M. E. Yard
Roy Slocum

Inventor
Joseph G. Moomy
by W. E. Lint
his Atty.

UNITED STATES PATENT OFFICE.

JOSEPH G. MOOMY, OF ERIE, PENNSYLVANIA.

PNEUMATIC TIRE.

SPECIFICATION forming part of Letters Patent No. 722,376, dated March 10, 1903.

Application filed June 30, 1902. Serial No. 113,848. (No model.)

*To all whom it may concern:*

Be it known that I, JOSEPH G. MOOMY, a citizen of the United States, residing at Erie, in the county of Erie and State of Pennsylvania, have invented new and useful Improvements in Pneumatic Tires, of which the following is a specification.

This invention relates to pneumatic tires; and it consists in certain improvements in the construction thereof, as will be hereinafter fully described, and pointed out in the claim.

More particularly, the invention relates to such a construction of pneumatic tires as will facilitate the repairing of the same without weakening the fabric of which they are composed.

Figure 1:
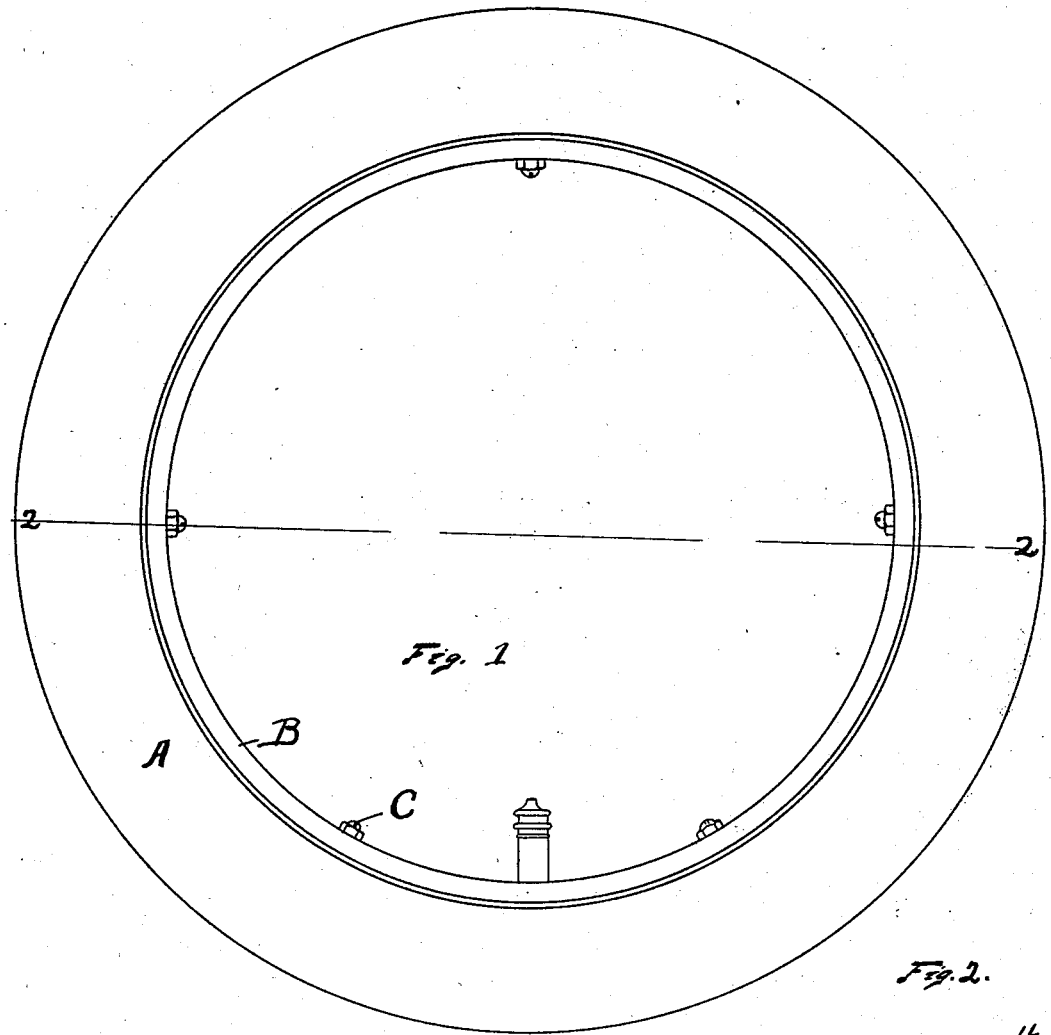
Figure 2:
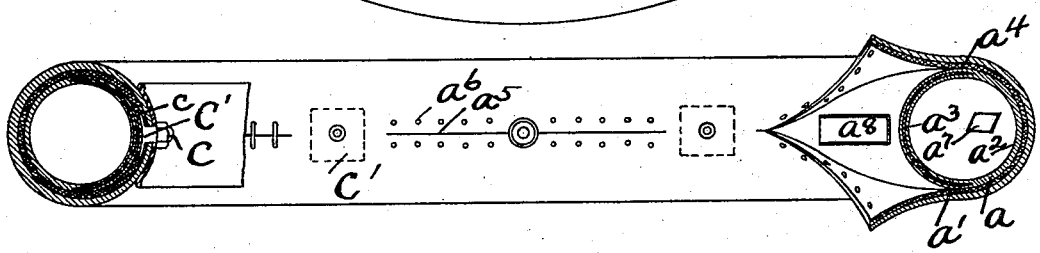

Figure 1 shows a side elevation; Fig. 2, a section on the line 2 2 in Fig. 1.

A marks the tire; B, the rim; C, the securing-screws.

The tire is formed of the inner tube $a$ and the outer jacket $a'$. The tread portion $a^2$ of the inner tube is preferably of rubber, and the rim portion is provided with a reinforcing fabric $a^3$, with a coating of rubber on the outside of the fabric. The tread portion of the tube $a^2$ is preferably secured to or incorporated with the tread portion of the outer jacket $a'$. The two parts are secured together to a point $a^4$, so that the reinforcing fabric $a^3$ extends beyond the point of union between the tube and outer jacket. The outer jacket preferably has the slit $a^5$, with the lace-opening $a^6$ along its edge. The nuts $C'$ for the screws $C$ are provided with the flanges $c$, which are secured in the fabric forming the rim portion of the outer jacket. The outer jacket and the tube may be secured together at the point where the nuts $C'$ are placed or may be detached as in other parts of the tire.

When the tire is punctured, the puncture extends through the inner tube of the tread portion, and as the tread portion is practically one piece the point where the inner tube is punctured may be readily located. The jacket is opened opposite the puncture and the rim portion of the tube $a$ cut open at this point. A patch $a^7$ can then be placed over the puncture of the tread portion and then a patch $a^8$ placed on the outer part of the tube. The reinforcing material $a^3$ permits this opening of the inner portion of the jacket, while, on the other hand, the practically one-part structure of the tread portion facilitates the locating of the puncture. In this way a tire may be repaired without removing the inner tube and without enlarging the original puncture. By reinforcing the exposed portion of the tube it is less liable to crack. Preferably the reinforcing fabric should not extend entirely around the tube. If such were the case, the puncture closed on the inner surface of the tube in the tread portion would still be open to the fabric, and it will readily be seen that the patch $a^8$ would not close the tube to the fabric opposite the puncture. With such a structure, therefore, air might escape by the way of the fabric through the puncture. I prefer, therefore, as before stated, to terminate the reinforcing fabric at the point $a^4$.

What I claim as new is—

In a pneumatic tire, the combination of an air-tube formed of rubber having incorporated within its walls a reinforcing fabric, said fabric extending from the rim portion of the tube around only a portion of the transverse circumference of said tube, and an outer jacket, said tube being secured to the outer jacket along the tread portion and free from said jacket along the rim portion, the reinforcing fabric extending into the portion of the tube secured to the outer jacket.

In testimony whereof I have hereunto set my hand in the presence of two subscribing witnesses.

JOSEPH G. MOOMY.

Witnesses:
JUSTIN P. SLOCUM,
U. G. YARD.